US010757663B2

(12) United States Patent
Schwent et al.

(10) Patent No.: US 10,757,663 B2
(45) Date of Patent: Aug. 25, 2020

(54) INTERMODULATION LIMITING ON MULTIPLE TRANSMITTER DEVICE

(71) Applicant: MOTOROLA MOBILITY LLC, Chicago, IL (US)

(72) Inventors: Dale Schwent, Shaumburg, IL (US); Armin Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/165,901

(22) Filed: Oct. 19, 2018

(65) Prior Publication Data
US 2020/0128495 A1    Apr. 23, 2020

(51) Int. Cl.
*H04W 52/38*    (2009.01)
*H04W 52/24*    (2009.01)
*H04W 52/26*    (2009.01)

(52) U.S. Cl.
CPC ....... *H04W 52/386* (2013.01); *H04W 52/243* (2013.01); *H04W 52/26* (2013.01)

(58) Field of Classification Search
CPC . H04W 52/386; H04W 52/26; H04W 52/243; H04W 24/00; H04W 52/00; H04B 15/00; H04B 7/00
See application file for complete search history.

(56) References Cited

U.S. PATENT DOCUMENTS

| 8,706,061 | B2 | 4/2014 | Klomsdorf et al. | |
| 2004/0152429 | A1* | 8/2004 | Haub | H04B 1/1027 455/102 |
| 2005/0208960 | A1* | 9/2005 | Hassan | H04W 52/346 455/522 |
| 2006/0292986 | A1* | 12/2006 | Bitran | H04W 16/14 455/41.2 |
| 2012/0088455 | A1 | 4/2012 | Love et al. | |

(Continued)

OTHER PUBLICATIONS

Qualcomm Atheros, Inc. "WCN36xO LTE/WLAN/Bluetooth Coexistence", 80N5047-5 Rev. R, 2011.

*Primary Examiner* — Dong-Chang Shiue
(74) *Attorney, Agent, or Firm* — Yudell Isidore PLLC

(57) ABSTRACT

A communication device, method, and computer program product provide communication quality mitigation in response to an intermodulation product resulting from concurrent transmission by first and second transmitters of a communication device. A controller is communicatively coupled to the first and second transmitters and executes an intermodulation mitigation utility that enables the communication device to monitor transmission characteristics of first and second transmitters of the communication device. The controller determines whether concurrent transmissions by the first and second transmitters create an intermodulation product having a power level at one or more frequencies that exceeds an intermodulation threshold for at least one of: (i) spurious emissions to a thirty-party receiver; and (ii) desensing a receiver of the communication device. Controller enables communication device to perform reduced transmit power mode that reduces the power level of the intermodulation product to not exceed the intermodulation threshold and performs communication quality mitigation.

20 Claims, 8 Drawing Sheets

(56) References Cited

U.S. PATENT DOCUMENTS

| | | | |
|---|---|---|---|
| 2012/0184228 A1* | 7/2012 | Mujtaba | H04B 1/04 455/103 |
| 2012/0184265 A1 | 7/2012 | Love et al. | |
| 2012/0184327 A1* | 7/2012 | Love | H04B 1/0064 455/552.1 |
| 2012/0257519 A1* | 10/2012 | Frank | H04L 5/0035 370/252 |
| 2014/0051373 A1* | 2/2014 | Klomsdorf | H04B 1/0475 455/114.3 |
| 2016/0088572 A1* | 3/2016 | Bi | H04W 52/241 455/41.2 |
| 2016/0269130 A1* | 9/2016 | Goedken | H04B 17/14 |
| 2018/0323930 A1* | 11/2018 | Ahn | H04W 52/146 |

* cited by examiner

INTERMODULATION LIMITING ON MULTIPLE TRANSMITTER DEVICE

BACKGROUND

1. Technical Field

The present disclosure relates generally to communication devices with multiple transmitters, and more particularly to communication devices having concurrently-transmitting multiple transmitters.

2. Description of the Related Art

Communication devices, such as smartphones, are capable of communicating via numerous protocols These protocols include: (i) Bluetooth (BT) connections; (ii) Global Positioning System (GPS); (iii) Personal Access Networks (PAN); (iv) Wireless Local Access Networks (WLAN) such as Wireless Fidelity (Wi-Fi); and (v) Wireless Wide Area Networks (WWAN) such as 3rd Generation Partnership Project (3GPP) Long Term Evolution (LTE), etc. To increase the functionality of communication devices, multiple transmitters and receivers are often included to enable simultaneous communication sessions, such as with cellular nodes, Wi-Fi nodes, GPS navigation satellites, etc. Different transmitters may be using the same protocols or even communicating with the same node.

Developments have been announced for leveraging fifth generation (5G) higher data rates for certain smartphones by way of an external modem. The external modem, packaged as a modular component, introduces an independently controlled transmitter to an existing multiple transmitter device. This additional transmitter can intermodulate with other transmitters, such as a fourth generation (4G) cellular radio.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
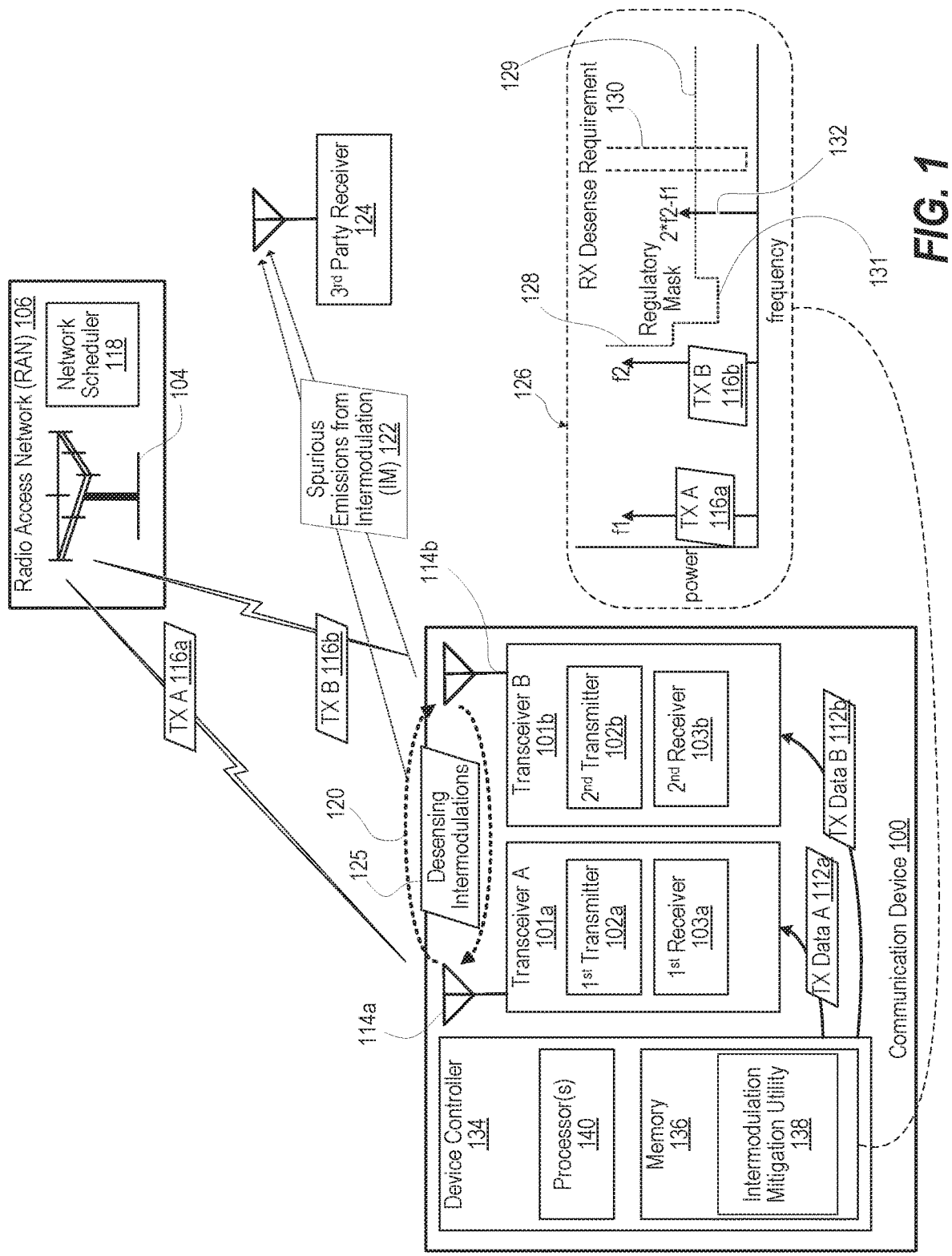
FIG. 1 is a simplified functional block diagram illustrating a communication device having at least two transmitters, according to one or more embodiments.

According to aspects of the present disclosure, a communication device, a computer program product, and a method provide communication quality mitigation in response to a forward or reverse intermodulation product resulting from concurrent transmission by multiple transmitters of a communication device. The communication device includes a controller communicatively coupled to each of the multiple transmitters. The controller executes an intermodulation mitigation utility that enables the communication device to monitor transmission characteristics of concurrently-transmitting transmitters of the communication device. The controller determines whether concurrent transmissions by the first and second transmitters create an intermodulation product having a power level at one or more frequencies that exceeds an intermodulation threshold for at least one of: (i) creating spurious emissions to a thirty-party receiver; and (ii) desensing a receiver of the communication device. In response to determining that the intermodulation product exceeds the intermodulation threshold, the controller enables the communication device to trigger operation of a reduced transmit power mode operation. The reduced transmit power mode operation reduces the power level of the intermodulation product to not exceed the intermodulation threshold. The reduced transmit power mode operation includes communication quality mitigation.

Operating multiple RF transmitters simultaneously in a device has at least two undesirable effects that arise from forward and reverse intermodulation: (i) increase in spurious emissions that may violate regulatory requirements; and (ii) increase in receiver desense that may degrade performance of the device's own receiver. Desense is the degradation in sensitivity due to noise sources. Generally-known systems cut back the power of at least one transmitter during simultaneous operation to mitigate each of these two effects. However, when power cut back is applied indiscriminately, the quality of the signal on the affected transmit channel is reduced, which can negatively affect successful reception by an intended remote network base station. However, introduction of communication quality mitigation compensates for most or all of the degradation.

According to one or more aspects of the present disclosure, a method includes monitoring, by a controller, transmission characteristics of first and second transmitters of a communication device having multiple transmitters that can concurrently transmit. The method includes determining whether concurrent transmissions by the first and second transmitters create an intermodulation product having a power level at one or more frequencies that exceeds an intermodulation threshold for at least one of: (i) spurious emissions to a thirty-party receiver; and (ii) desensing a receiver of the communication device. In response to determining that the intermodulation product exceeds the intermodulation threshold, the method incudes triggering, by the controller, a reduced transmit power mode operation is triggered that reduces the power level of the intermodulation product to not exceed the intermodulation threshold and that includes communication quality mitigation.

According to one or more aspects of the present disclosure, a computer program product includes program code on a computer readable storage device that when executed by a processor associated with a communication device, the program code enables the communication device to provide operational functionality to mitigate intermodulation. The functionality includes monitoring transmission characteristics of first and second transmitters of the communication device that can concurrently transmit. The functionality includes determining whether concurrent transmissions by the first and second transmitters create an intermodulation product having a power level at one or more frequencies that exceeds an intermodulation threshold for at least one of: (i) spurious emissions to a thirty-party receiver; and (ii) desensing a receiver of the communication device. In response to determining that the intermodulation product exceeds the intermodulation threshold, the functionality includes triggering operation of a reduced transmit power mode operation that reduces the power level of the intermodulation product to not exceed the intermodulation threshold and that includes communication quality mitigation.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a simplified functional block diagram illustrating a communication device 100 having first and second transceivers 101a and 101b that respectively include transmitters 102a and 102b. Transmitters 102a and 102b can transmit concurrently to one or more network entities, such as node(s) 104 of radio access node (RAN) 106. For clarity, only two transmitters 102a and 102b are included, although aspects of the present disclosure for limiting aggregate transmit power with communication quality mitigations can be applied to having three or more transmitters. First transmitter 102a is part of first transceiver 101a that also includes first receiver 103a. Second transmitter 102b is part of second transceiver 101b that also includes second receiver 103b. Each transceiver 101a and 101b communicates respective transmit (TX) data traffic A-B 112a and 112b over a dedicated or shared antenna system, represented by individual antennas 114a and 114b. First and second transmitters 102a and 102b have at least a degree of autonomy from the other transmitters 102a and 102b in being scheduled, requesting scheduling, or selecting scheduling respective uplink transmissions TX A-B 116a and 116b to node(s) 104. In one or more embodiments, first and second transceivers 101a and 101b can expressly or implicitly request a change in scheduling of transmit characteristics to a network scheduler 118 of RAN 106. In one or more embodiments, one of the first and second transceivers 101a and 101b make the request for a change in transmit characteristics by reporting a transmit power reduction. The one of the first and second transceivers 101a and 101b triggers a communication quality mitigation by prompting a response from the node 104 to schedule a change in transmit characteristics that compensates for the transmit power reduction.

When first and second transmitters 102a and 102b transmit concurrently, forward or reverse intermodulation 120 can occur, resulting in spurious emission 122 in some instances that interferes with a third-party receiver 124. Forward or reverse intermodulation 120 can also result in receiver desensing signal 125 to one of receivers 103a and 103b of the other one of first and second transceivers 101a and 101b. Frequency diagram 126 includes representative emissions of uplink transmissions TX A and B 116a and 116b at respective frequencies f1, f2 that do not exceed a spurious emissions regulatory mask 128. Representative emissions of uplink transmissions TX A and B 116a and 116b do not fall within receive (RX) desense requirement 130 of receivers 103a and 103b. However, one type of interference, third-order intermodulation, creates a spurious emission interference 132 at the frequency 2*f2−f1 that exceeds spurious emissions regulatory mask 128. Similar intermodulation products can also fall within a frequency band of receiver desense requirement 130. Spurious emissions 122 are affected by operating frequency of first and second transceivers 101a and 101b. The frequency band of a receiver that is concurrently receiving with the transmitters is narrower than the spurious emission regulatory mask. Thus, receiver desense is greatly affected as a function of particular operating frequencies, as illustrated in frequency diagram 126.

In many cases, the spurious emissions regulatory mask 128 has a general level 129 for all RF frequencies; However, for certain frequencies close to the transmit band, spurious emissions regulatory mask 128 may be lesser or greater than that the general level 129. A lower level 131 is illustrated in frequency diagram 126. The frequency of the interference 132 as an intermodulation product depends on the uncorrelated frequency of both transmitters 102a and 102b. As the frequency of either or both of the two transmitters 102a and 102b changes, the interference 132 may move into the region where the spurious emissions regulatory mask 128 is more stringent or less stringent. Rx desense requirement is very dependent on frequency. For certain frequencies, a low amplitude of interference 132 will desense the receiver. For other frequencies, the receiver has a high degree of filtering that relates to an allowed high amplitude of interference 132. Interference 132 will only cause an issue when interference 132 falls within the receive bandwidth of one of receivers 103a and 103b. The receive bandwidth and sensitivity within the receive bandwidth corresponds to receiver desense requirement 130. Power level of intermodulation products (interference 132) that cause spurious emissions and receiver desense are related to the level of the desired transmit power levels. For the third order example, the power at 2*f2−f1 is proportional to the respective output power P1 and P2 of uplink transmissions TX A and B 116a and 116b (i.e., 2*P2+P1). The frequency of the interference 132 is a predictable product of the frequencies of transmitters 102a and 102b. Power of each transmitters 102a and 102b is directly related to the power of the interference 132. Thus the power change of interference 132 with desired transmit power is predictable.

In addition to being frequency dependent, performance can be driven by timing of transmissions. Many uplink communication protocols include scheduling first and second transceivers 101a and 101b to only transmit at certain times. An intermodulation interference affecting spurious emissions will only be produced if both transmitters 102a and 102b are active at the same time. An intermodulation interference that desenses one of receivers 103a and 103b will only be produced if both transmitters 102a and 102b are active at the same time and one of receiver 103a and 103b is scheduled to receive.

According to one aspect, device controller 134 includes memory 136 containing intermodulation mitigation utility 138 that, when executed by at least one processor 140, enables communication device 100 to have functionality that mitigates spurious emissions 122 and receiver desensing signal 125. In one or more embodiments, device controller 134 monitors transmission characteristics of first and second transmitters 102a and 102b of communication device 100 that concurrently transmit uplink transmissions TX A and B 116a and 116b. Device controller 134 determines whether concurrent transmissions by the first and second transmitters create an intermodulation product having a power level at one or more frequencies that exceeds an intermodulation threshold for at least one of: (i) spurious emissions to thirty-party receiver 124; and (ii) internal interference sufficient to desense receiver 103a and 103b of communication device 100. In response to determining that the intermodulation product exceeds the intermodulation threshold, device controller 134 triggers a reduced transmit power mode operation by communication device 100. Reduced transmit power mode operation causes a reduction in the power level of the intermodulation product. The reduction is sufficient for the intermodulation product to not exceed the intermodulation threshold. The reduced transmit power mode operation also includes communication quality mitigation.

In one or more embodiments, communication quality mitigation includes: (i) determining which one of the first and second transmitters should reduce transmit power based on the selected transmitter having a lower priority of traffic. In one or more embodiments, communication quality mitigation includes: (ii) communicating the reduced transmit power levels of the first and second transmitter to a network node to prompt the network node to make a transmission characteristic change. In one or more embodiments, communication quality mitigation includes: (iii) assigning all traffic to one transmitter and turning off the other transmitter. In one or more embodiments, communication quality mitigation includes: (iv) improving amplification linearity. In one or more particular embodiments, improving amplification linearity is by: (a) changing a power amplifier load line. In one or more particular embodiments, improving amplification linearity is by: (b) raising a power amplifier supply voltage. In one or more particular embodiments, improving amplification linearity is by: (c) reducing an amount of envelope tracking applied to a power amplifier.

In one or more embodiments, device controller 134 enables the communication device 100 to trigger operation of the reduced transmit power mode operation using one or more techniques. Communication device 100 can: (i) reduce the transmit power level of at least one of the first and second transmitters 102a and 102b. Communication device 100 can: (ii) communicate the transmit power levels of the first and second transmitters 102a and 102b to at least one network node 104 that schedules communication with the first and second transmitters 102a and 102b. Communication device 100 can: (iii) receive, from the at least one network node 104, a transmission characteristic change that provides communication quality mitigation. Error rates tend to increase during transmission and reception with reduced transmission power. In one or more exemplary embodiments, the transmission characteristic change is a selected at least one of: (a) coding gain; (b) data rates; and (c) transmission times for the selected one of the first and second transmitters 102a and 102b to optimize communication quality at the reduced transmit power level. As presented herein, coding gain is achieved by the node 104 instructing the respective transmitter 102a and 102b to include a more robust error correction code with the data. Although an amount of data is reduced, the more robust error code allows recovering the data even with increased error rates. Reducing data rates can make detection of the data state easier for the receiving network. Changing transmission times for first and second transmitters 102a and 102b avoids concurrent transmissions and thus no intermodulation.

In one or more embodiments, device controller 134 enables communication device 100 to trigger operation of the reduced transmit power mode operation using another technique. Communication device 100 reduces the transmit power level of a selected one of the first and second transmitters 102a and 102b, based on the selected transmitter having a lower priority of traffic 112a and 112b than the other transmitter 102a and 102b. In one or more embodiments, device controller 134 enables communication device 100 to trigger operation of the reduced transmit power mode operation using another technique. Communication device 100 assign traffic scheduled respectively for the first and second transmitters 102a and 102b to a selected one of the transmitters 102a and 102b and turning off the other transmitter 102a and 102b.

In one or more embodiments, device controller 134 enables communication device 100 to trigger operation of the reduced transmit power mode operation using another technique. Communication device 100 improve amplification linearity of one of the first and second transmitters 102a and 102b to reduce the intermodulation product. In one or more embodiments, to improve amplification linearity, device controller 134 triggers selection of at least one or more of: (i) changing a power amplifier load line; (ii) raising a power amplifier supply voltage; and (iii) reducing an amount of envelope tracking applied to a power amplifier.

In one or more embodiments, device controller 134 determines that concurrent transmissions by the first and second transmitters 102a and 102b create the intermodulation product. Device controller 134 responds to the determination by triggering reduced transmit power mode operation. In particular, device controller 134 determines that the intermodulation product has a power level at one or more frequencies that exceeds the intermodulation threshold for spurious emissions.

In one or more embodiments, device controller 134 enables the communication device 100 to: (i) monitor reception characteristics of first and second receivers 103a and 103b associated respectively with the first and second transmitters 102a and 102b; and (ii) trigger operation of the reduced transmit power mode operation in response to determining that concurrent transmissions by the first and second transmitters 102a and 102b create the intermodulation product having the power level at one or more frequencies that exceeds the intermodulation threshold. Device controller 134 enforces the intermodulation threshold to avoid degraded reception due to receiver desensing. The intermodulation threshold is based on a value that is sufficient for desensing at least one of the first and second receivers 103a and 103b, based on the monitored transmission and reception characteristics. In a particular embodiment, monitoring reception characteristics includes monitoring at least one of signal strength, coding gain, and data type.

Figure 2:
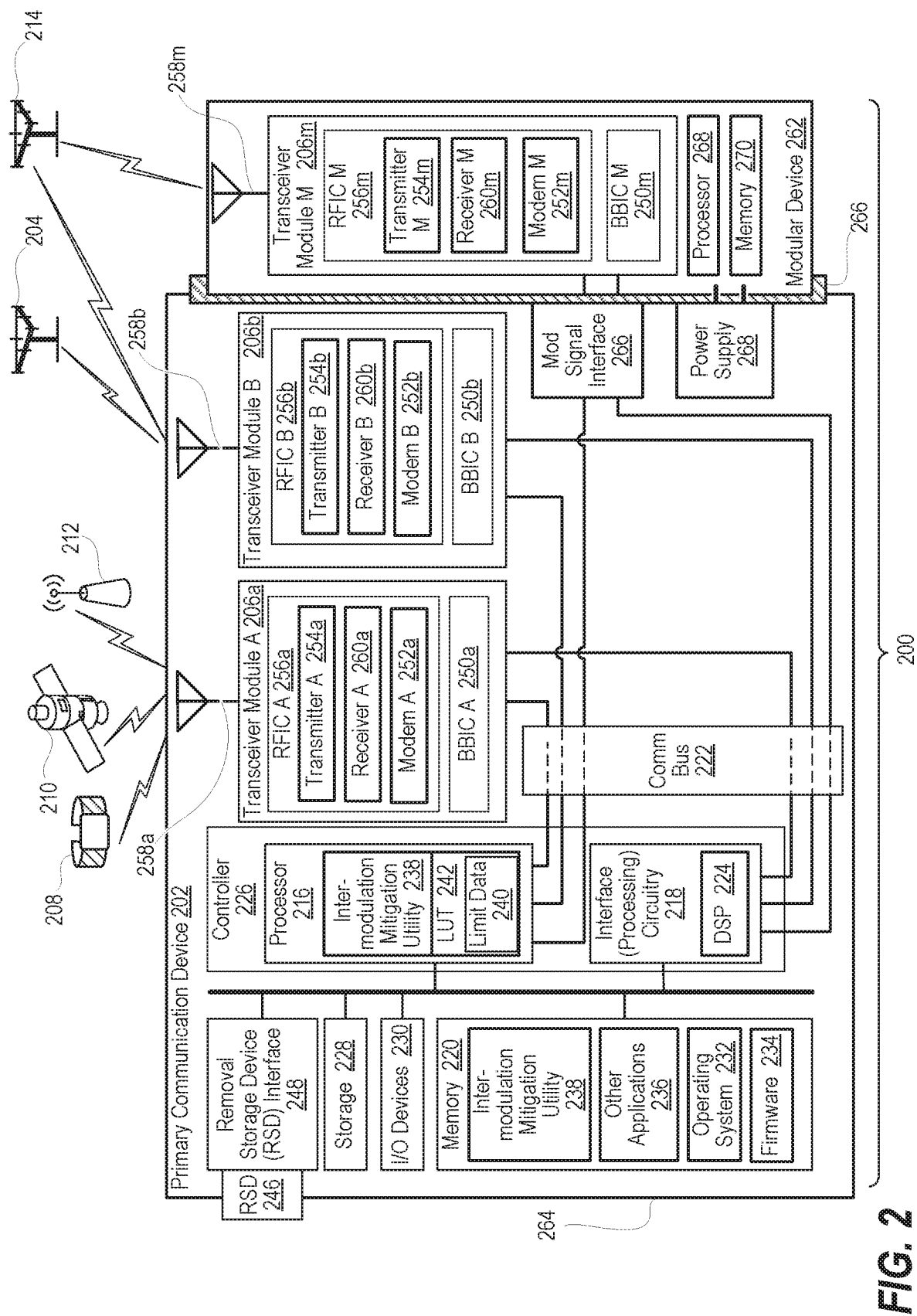
FIG. 2 is a functional block diagram illustrating an example communication device having both a primary and a modular component with respective transmitters, and within which certain of the functional aspects of the described embodiments may be implemented.

With specific reference now to FIG. 2, there is depicted a block diagram of an example wireless communication device 200, within which the functional aspects of the described embodiments may be implemented. Wireless communication device 200 transmits and receives RF signals over an air interface via uplink and/or downlink channels between wireless communication device 200 and communication network equipment. In one or more embodiments, wireless communication device 200 can be a mobile cellular device/phone or smartphone, or laptop, netbook or tablet computing device, or other types of communication devices.

Communication device 200 includes primary communication device 202 and may wholly comprise primary communication device 202 without any peripheral or augmenting devices. Primary communication device 202 enables communication with fourth generation (4G) cellular network equipment 204 and enables user to interact with communication device 200. Primary communication device 202 includes first transceiver module A 206a that communicates with one or more of a personal access network (PAN) device such as smartwatch 208 via a Bluetooth wireless link, global positioning system (GPS) satellite 210, and node 212 of a wireless local access network (WLAN). Primary communication device 202 includes transceiver module B 206b that communicates with base station 214 or other network nodes with similar operating frequency bands.

Primary communication device 202 includes processor 216 and interface (processing) circuitry 218, which are connected to memory 220 via an interconnect such as communication bus 222. Interface circuitry 218 includes digital signal processor (DSP) 224. Processor 216 and interface (processing) circuitry 218 can be referred to as controller 226. Controller 226 controls the communication, user interface, and other functions and/or operations of wireless communication device 200. These functions and/or operations thus include, but are not limited to including, application data processing and signal processing. Wireless communication device 200 may use hardware component equivalents such as special purpose hardware, dedicated processors, general purpose computers, microprocessor-based computers, micro-controllers, optical computers, analog computers, dedicated processors and/or dedicated hard wired logic. The various hardware components within wireless communication device 200 can be electrically and/or communicatively coupled together, as illustrated in FIG. 2. As utilized herein, the term "communicatively coupled" means that information signals are transmissible through various interconnections between the components including wireless links. The interconnections between the components can be direct interconnections that include conductive transmission media or may be indirect interconnections that include one or more intermediate electrical components. Although certain direct interconnections are illustrated in FIG. 2, it is to be understood that more, fewer or different interconnections may be present in other embodiments.

Primary communication device 202 includes storage 228. Also illustrated within primary communication device 202 are input/output (I/O) devices 230. Memory 220 of primary communication device 202 can include volatile memory and/or non-volatile memory. Memory 220 stores program code or software, such as operating system 232, as well as firmware 234. One or more other executable applications 236 can be stored within memory 220 for execution by controller 226, such as intermodulation mitigation utility 238 that monitor aggregate transmission power levels. Regulatory transmit power limit data 240 can be stored as data, such as within a lookup table (LUT) 242, in memory 238 for reference by controller 226. Proximity detector 244 provides information to controller 226 of whether a person is within a certain proximity distance to wireless communication device 200.

Intermodulation mitigation utility 238 and other software and data necessary to perform aspects of the present disclosure can be stored on a computer readable storage device. In one or more embodiments, removable storage device (RSD) 246 that is received in RSD interface 248 of primary communication device 202 is a computer readable storage device. RSD 246 can be accessed by controller 226 to provision wireless communication device 200 with program code that when executed by controller 226 provides the functionality to wireless communication device 200 to perform intermodulation mitigation for concurrent transmissions.

Transceiver modules A and B 206a and 206b include a respective baseband integrated circuit (BBIC) A and B 250a and 250b and radio frequency integrated circuit (RFIC) A and B 256a and 256b. RFICs A and B 256a and 256b include respective modems A and B 252a and 252b, RF transmitters A and B 256a and 256b, and RF receivers A and B 260a and 260b. BBIC A and B 250a and 250b are communicatively coupled via communication bus 222 to controller 226 to receive baseband data traffic. BBIC A and B 250a and 250b send baseband data traffic to RFICs A and B 256a and 256b. Modem A and B 252 and 252b encode the baseband data traffic for transmission with appropriate communication protocols. RF transmitters A and B 256a and 256b respectively of transceiver modules A and B 206a and 206b modulate the output of modems A and B 252a and 252b respectively on RF carriers for transmission by antennas 258a and 258b. RF receivers A and B 260a and 260b respectively of transceiver modules A and B 206a and 206b demodulate the signals received respectively on RF carriers by antennas 258a and 258b. The demodulated signals are decoded by modems A and B 252a and 252b.

In operation, transceiver modules A and B 206a and 206b can perform generally-known Wi-Fi coexistence management to reduce interference with either of the primary or modular radio (transmitter B and M 254b and 254m) that operates on an adjacent band such as Long Term Evolved (LTE) bands 7, 40, and 41. For example, Wi-Fi radio can perform one or more of the following operations: (i) Wi-Fi radio avoids channels that cause interference in each instance where the Wi-Fi radio is allowed to do so; (ii) when an interfering channel cannot be avoided, Wi-Fi radio backs off power during LTE reception by one of the primary and mod cellular radios if sufficient radio desense occurs; (iii) when interfering channel cannot be avoided, Wi-Fi radio backs off power during Wi-Fi setup; (iv) when interfering channel cannot be avoided and one of the primary and mod cellular radios is transmitting LTE protocol uplink by time division duplex (TDD), Wi-Fi radio will avoid to the extent possible concurrent transmitting; and (v) when interfering channel cannot be avoided and one of the primary and mod cellular radios is transmitting LTE protocol uplink by TDD, Wi-Fi radio will avoid to the extent possible receiving. However, the generally-known Wi-Fi coexistence management techniques are not meant to address, nor are such techniques sufficient, to avoid occurrences of forward or reverse intermodulation between any combination of transmitters A, B and M 254a, 254b, and 254m that create spurious emissions to third-party receivers or desense receivers A, B and M 260a, 260b, and 260m that is receiving concurrently.

Primary communication device 202 includes electrical interfaces and mechanical mounting features for receiving one of one or more types of modular ("mod") devices 262 that augment or extend the functionality of primary communication device 202. Communication device 200 becomes the combination of primary communication device 202 and mod device 262. Examples of mod devices include a stereo loud speaker, a display projector, a mobile printer, a voice commanded smart speaker, a gamepad, a style shell, a 360 camera, a power pack, a camera with 10× optical zoom, a wireless charging shell, a custom developed mod, etc. In an exemplary embodiment, mod device 262 provides fifth generation (5G) cellular data communication capabilities. Housing 264 of primary communication device 202 includes mounting surface 266 that is shaped to conform to and engage with mod housing 268 of mod device 262. Mod signal interface 266 and power supply 268 of primary communication device 202 provide communication and power respectively through mounting surface 262 to mod device 262. In the illustrative embodiment, mod device 262 includes later generation communication capabilities, such as RF transceiver M 206m that enables higher data rate 5G communication with base station 220 of a wireless wide area access network (WWAN). When mod device 262 is physically engaged to primary communication device 202, RF transceiver M 206m becomes available to the controller 226 for communication. In one or more embodiments, magnets embedded in the mod device 262 are attracted to ferrous material of the housing 264 to create engagement between communication device 202 and mod device 206. Mod signal interface 266 and power supply 268 of primary communication device 202 present electrical contact pads that align with electrical contact pins of mod housing 268. Primary communication device 202 and attached mod device 262 form wireless communication device 200. When mod device 262 is physically disengaged from primary communication device 202, mod device 262 can be used as a personal Wi-Fi hotspot by transceiver A 206a of communication device 202.

Mod device 262 includes transceiver module M 206m that communicates with base station 220. Transceiver module M 206m includes a BBIC M 250m that are communicatively coupled via communication bus 222 to controller 226. Baseband data traffic is encoded for transmission and decoded during receiving by modems A and B 252 and 252b with appropriate communication protocols respectively by radio frequency integrated circuit (RFIC) A and B 254a and 254b of transceiver modules A and B 206a and 206b. RF transmitters A and B 256a and 256b respectively of transceiver modules A and B 206a and 206b modulate the output of modems A and B 252a and 252b respectively on RF carriers for transmission by antennas 258a and 258b. RF receivers A and B 260a and 260b respectively of transceiver modules A and B 206a and 206b demodulate the signals received respectively on RF carriers by antennas 258a and 258b. The demodulated signals are decoded by modems A and B 252a and 252b. Mod processor 268 and memory 270 on mod device 262 can augment or perform certain autonomous functions for controller 226 of primary communication device 202.

In one or more embodiments, mod device 262 is able to transmit within the same band at the same time as primary communication device 202. Either controller 226 of primary communication device 202 or processor 268 of mod device 262 can function as a master controller. For clarity, the present disclosure describes controller 226 as the master controller that coordinates the actions of two transmitters, such as transceivers A and M 258a and 258m, that can have an intermodulation product that is above a proscribed limit. Processor 268 of mod device 262 communicates transmit power, transmit frequency, and on/off state information of all active transmitters M 254m of mod device 262 to controller 226. Controller 226 can receive information via communication bus 240, including whether mod device 262 is engaged and active. In one or more embodiments, mod device 262 can operate independently from primary communication device 202, such as acting as a remote 5G hotspot. Controller 226 also has information about on/off state and transmit power for transmitters A and B 254a and 254b within primary communication device 202. Controller 226 references transmit power limit data 240 in LUT 242 to see what the appropriate maximum power reduction of each transmitter what should be to remain within any proscribed limits for each set of conditions.

In one or more embodiments, an appropriate communication mitigation mode can depend on whether or not the mod device 262 is attached or detached. For example, mod device 262 may not transmit on a cellular uplink when detached, obviating the need for certain mitigation techniques. Intermodulation between transceivers A, B, and M 206a, 206b and 206m may be significantly reduced with distance when mod device 262 is detached. Electromagnetic characteristics of the wireless communication device 200 can make certain frequencies less problematic for creating spurious emissions or receiver desensing. For example, antenna impedance can be different at various frequencies, attenuating interference signals to another transmitter or receiver. In addition, regulatory limits can change levels as a function of frequency. Transmit power required to reach a particular node 212 can differ, affecting what transmission characteristics result in exceeding a threshold for intermodulation interference. Based on the permissible levels for spurious emissions and equipment susceptibility for receiver desensing, empirical testing can pre-characterize an operational state as problematic or not. The operation state is defined by combinations of component states, sensor readings, and settings that comprise the transmission/reception characteristics. Each problematic operational state can be associated with one or more mitigations. The operational states identified by one or more inputs, such as transmit status, mod attachment status, sensor reading, etc., and the corresponding mitigation(s) are captured in LUT 242 for operational use of transceivers A, B, and M 206a, 206b and 206m. Additional inputs to the LUT 242 may be the type of traffic carried by each active transmitter (voice, data, etc.), which may be used to prioritize which transmitter powers are reduced and by how much. For example, if voice traffic is being carried by primary communication device 202 and data traffic is being carried by mod device 262, power for mod device 262 can be selected for reduction to meet aggregate transmit power limits while power is maintained for primary communication device 202. Using LUT 242, controller 226 can maintain quality of service (QoS) for voice communication to preserve the best user experience. Reduction in data rate would be less noticeable than loss of voice quality.

To mitigate reduced radio link performance, controller 226 can inform a receiving network, such as base station 220, of the need to reduce transmit power. Network (base station 220) in response can dictate changes in transmission characteristics, such as adjusting coding gains or data rates, to maintain or at least improve link performance at the reduced transmit power level. In addition, network (base station 220) can adjust transmit times so that concurrent transmissions by transceivers A, B, and M 206a, 206b and 206m of wireless communication device 200 are avoided, allowing each transmitter to operate at a power level that is not affected by another transmitter.

In one or more embodiments, instead of reducing transmit power of one of primary communication device 202 and mod device 262, controller 226 can turn off one or more transmitters (A, B, and/or M 254a, 254b, and 254m), diverting traffic to a remaining active transmitter. For example, transmitter M 254m of mod device 262 can be used for fifth generation (5G) high-speed data communication only and transmitter B 254b of primary communication device 202 can be used for transmitting using 4G, at a lower speed of data communication. Controller 226 can select one of the two transmitters B and M 254b and 254m to transmit and turn off the other transmitter.

Figure 3:
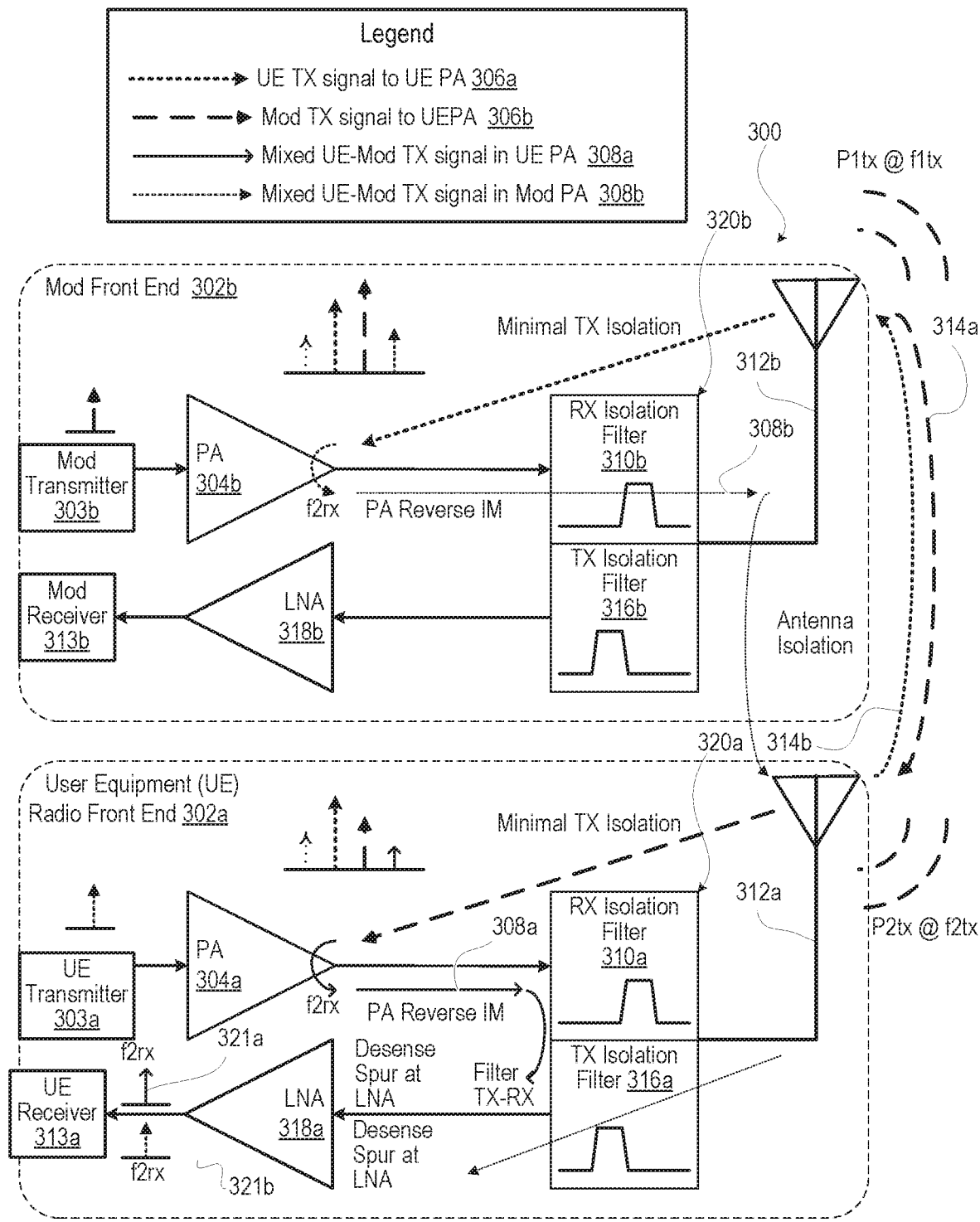
FIG. 3 is a functional block diagram illustrating a two-transmitter communication device that experiences receiver desense due to reverse intermodulation.

FIG. 3 is a functional block diagram of a dual-transmitter communication device 300 that is experiencing receiver desense of user equipment (UE) radio front end 302a caused by reverse intermodulation from mod front end 302b. UE radio front end 302a includes UE transmitter 303a that has a power amplifier (PA) 304a that amplifies UE TX signal 306a to produce amplified UE TX signal 308a. Amplified UE TX signal 308a passes through RX isolation filter 310a before being transmitted on uplink by UE antenna 312a as radiated UE signal 314b. Radiated UE signal 314a has transmit power P1 TX at frequency f1 TX. UE radio front end 302a also includes UE receiver 313a that receives RX signals by UE antenna 312a. The received RX signals pass through TX isolation filter 316a before being amplified by low noise amplifier (LNA) 318a. UE RX and TX isolation filters 310a, 316a are provided by UE duplex filter 320a. Similarly, mod front end 302b includes mod transmitter 303b that includes a PA 304b which amplifies mod TX signal 306b to produce amplified mod TX signal 308b. Amplified mod TX signal 308b passes through RX isolation filter 310b before being transmitted on uplink by UE antenna 312b as radiated mod signal 314a. Radiated mod signal 314a has transmit power P1 TX at frequency f1 TX. Mod radio front end 302b includes mod receiver 313b. The received RX signals from mod antenna 312b pass through TX isolation filter 316b before being amplified by LNA 318b. Mod RX and TX isolation filters 310b, 316b are provided by mod duplex filter 320b. Amplified RX signal from LNA 318b are provided to mod receiver 313b.

Reverse intermodulation can cause receiver desensing. Desensing is an increase of noise frequencies that coincides with information-carrying frequencies, making detection of the information more difficult. Radiated TX signals 314a, 314b from UE radio front end 302a and mod radio front end 302b, respectively, can respectively radiate into the other front end, mod radio front end 302b and UE radio front end 302a, with only a relatively small amount (~15 dB) of transmission isolation. The two radiated TX signals 314a, 314b mix respectively in both PAs 304a, 304b, creating respective RX interference signal 321a, 321b having a frequency f2 RX. UE RX interference signal 321a couples directly through UE duplex filter 320a into UE receiver 313a. Mod RX interference signal 321b couples back into UE receiver 313a through antenna isolation. Receiver 313a is desensed by RX interference signal 321a, 321b. A similar path of reverse intermodulation can occur for receiver desensing of mod receiver 313b.

For regulatory spurious signals, the same reverse intermodulation occurs that produces the spurs. For spurious emission, the spurs appear at the antennas 312a-b that radiate the spurs as spurious emissions to a third-party receiver. By contrast, for receiver desensing, the spurs couple to UE and mod receivers 313a, 313b. Spurs are reduced only by whatever filter attenuation corresponds to the spurious frequency. Since there is usually a regulatory requirement for in-band emissions, the filter isolation will be minimal when the two transmit signals are in the same band and close enough to each other, such that the interferer is also in the transmit band. This is the worst-case condition of concurrent transmission at about the same frequency such that filter isolation will be minimal. The present innovation provides communication quality mitigations for the worst-case condition. Thus, the present innovation provides an intermodulation mitigation for these worst-case conditions.

Figure 4:
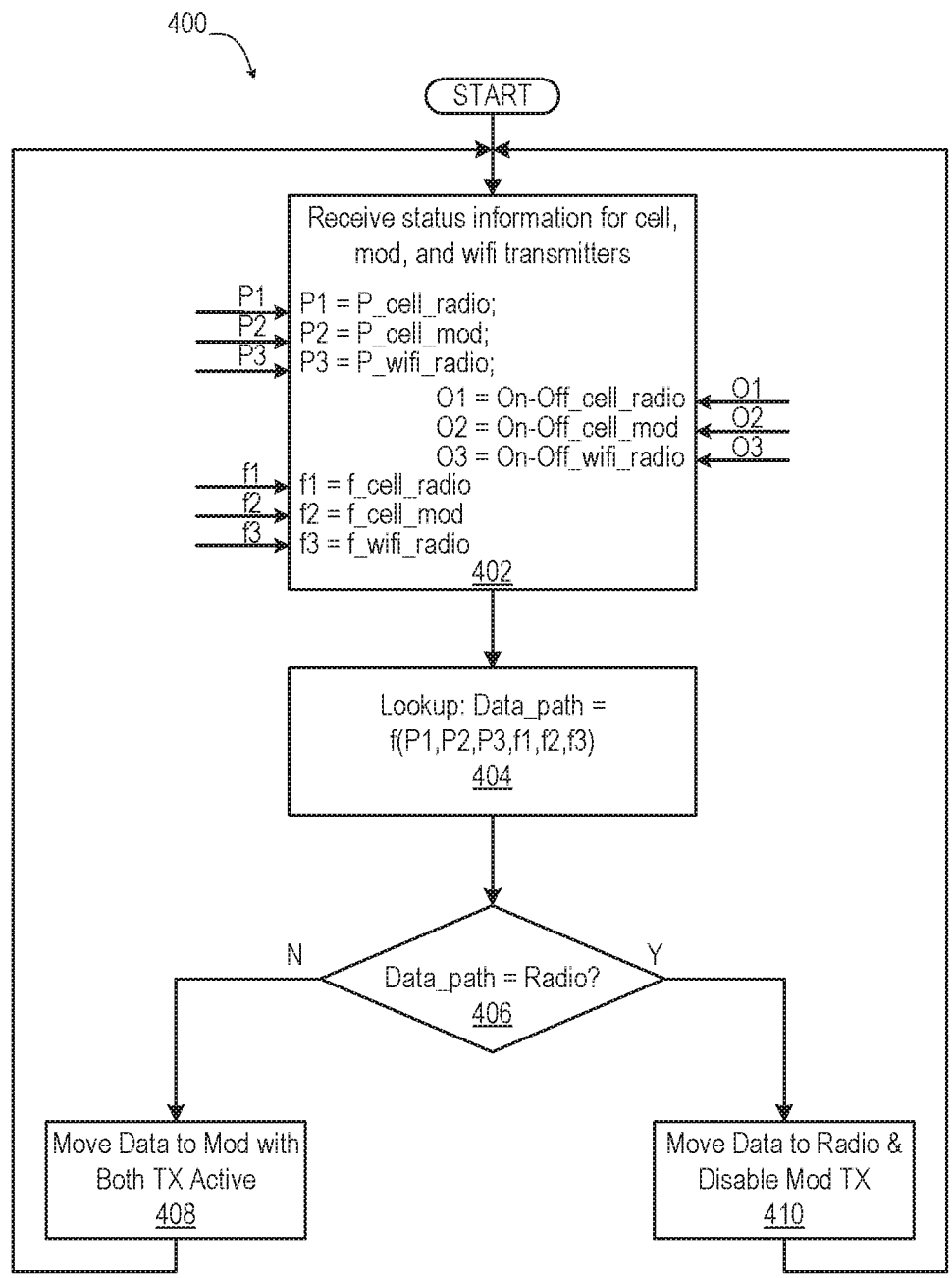
FIG. 4 is a functional block diagram illustrating an example method for controlling spurious emissions and/or receiver desensing using data traffic shifting, according to one or more embodiments.

FIG. 4 is a functional block diagram illustrating an example method 400 for controlling spurious emissions and/or receiver desensing for a three-transmitter device using data traffic shifting. In one or more embodiments, method 400 includes receiving, by a controller (134 (FIG. 1), 226 (FIG. 2)), status information for transmit power P1-P3 and transmit frequency f1-f3 and on/off status respectively for a primary cellular radio (P_cell_radio; f_cell_radio), a modular cellular radio (P_cell_mod; f_cell_mod), and a Wi-Fi radio (P_wifi_radio; f_wifi_radio) (block 402). Method 400 includes looking up, by the controller (134

(FIG. 1), 226 (FIG. 2)), what the appropriate data path (Data_path) is according to a LUT, based on the inputs P1-P3 and f1-f3 (block 404).

A determination is made as to whether the appropriate data path is primary cellular radio (decision block 406). In response to determining that the appropriate data path is primary cellular radio for all traffic, data from modular cellular radio is moved to primary cellular radio and transmission by modular cellular radio is disabled (block 408). Then, method returns to block 402. In response to determining that the appropriate data path is not primary cellular radio for all traffic, data from primary cellular radio is moved to modular cellular radio and transmission by both primary and modular cellular radios are enabled (block 410). In one or more embodiments, the primary cellular radio is enabled for purposes such as performing non-Internet data transmissions, e.g., voice over LTE (VoLTE). The non-Internet transmission has a very limited capacity for retransmission due to stringent time sensitivity. Then method returns to block 402.

Figure 5:
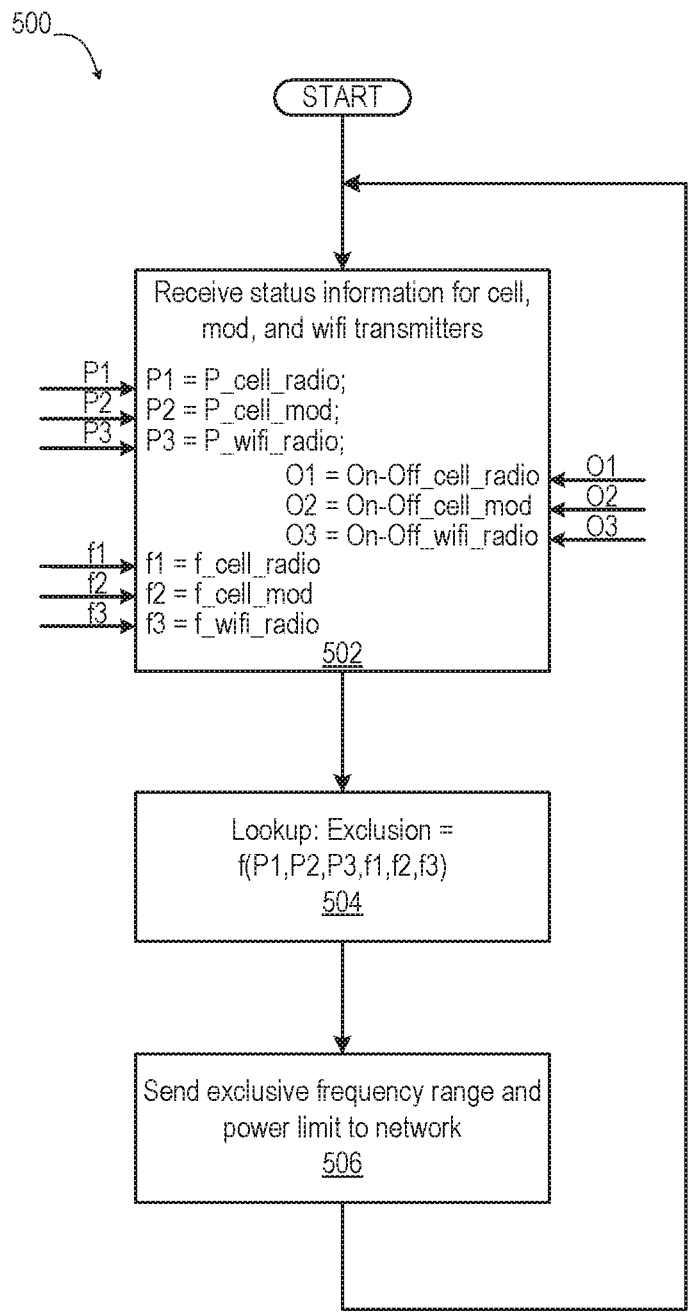
FIG. 5 is a functional block diagram illustrating an example method for controlling spurious emissions and/or receiver desensing using network shifting, according to one or more embodiments.

FIG. 5 is a functional block diagram illustrating an example method 500 for controlling spurious emissions and/or receiver desensing for a three-transmitter device using network scheduling. In one or more embodiments, method 500 includes receiving, by a controller (134 (FIG. 1), 226 (FIG. 2)), status information for transmit power P1-P3 and transmit frequency f1-f3 and on/off status respectively for a primary cellular radio (P_cell_radio; f_cell_radio), a modular cellular radio (P_cell_mod; f_cell_mod), and a Wi-Fi radio (P_wifi_radio; f_wifi_radio) (block 502). Method 500 includes looking up, by the controller (134 (FIG. 1), 226 (FIG. 2)), what the exclusion is, according to a LUT, based on the inputs P1-P3 and f1-f3 (block 504). Method 500 includes sending exclusion frequency range and power limit to network (block 506). The network can provide mitigations based on the exclusion frequency range and power limit. Then method returns to block 502.

Figure 6:
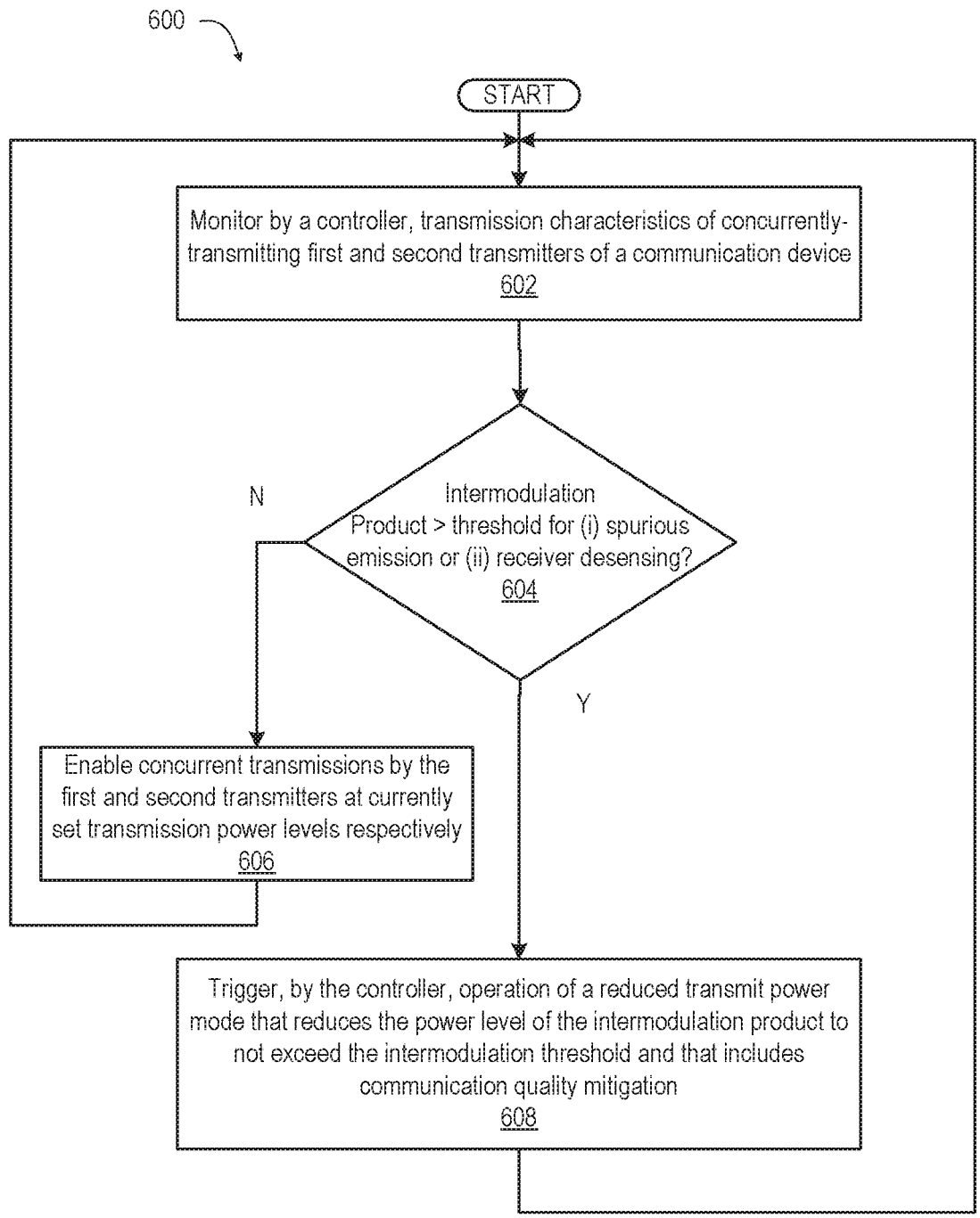
FIG. 6 is a flow diagram illustrating method for determining and implementing communication quality mitigation, according to one or more embodiments.

FIG. 6 is a flow diagram illustrating method 600 for determining and implementing communication quality mitigation for intermodulation interference). In one or more embodiments, method 600 includes monitoring, by a controller 134 (FIG. 1), 226 (FIG. 2) of a communication device 100 (FIG. 1), 200 (FIG. 2), transmission characteristics of concurrently-transmitting first and second transmitters (e.g., 102a and 102b (FIG. 1) or 254a, 254b and 254m (FIG. 2)) (block 602). A determination is made whether concurrent transmissions by the first and second transmitters (102a and 102b (FIG. 1) or 254a, 254b and 254m (FIG. 2) create an intermodulation product having a power level at one or more frequencies that exceeds an intermodulation threshold for at least one of: (i) spurious emissions to a thirty-party receiver; and (ii) desensing a receiver of the communication device (decision block 604). In response to determining that the intermodulation product does not exceed the intermodulation threshold, method 600 includes enabling concurrent transmissions by the first and second transmitters (102a and 102b (FIG. 1), 254a, 254b and 254m (FIG. 2)) at currently set respective transmission power levels (block 606). Then, method 600 returns to block 602 to continue monitoring for transmission characteristics of concurrently transmitting first and second transmitters. In response to determining that the intermodulation product exceeds the intermodulation threshold in decision block 604, triggering, by the controller (134 (FIG. 1), 226 (FIG. 2)), operation of a reduced transmit power mode that reduces the power level of the intermodulation product to not exceed the intermodulation threshold and that includes communication quality mitigation (block 608). Communication quality mitigation includes a selected one or more of: (i) selecting the one of the first and second transmitters (102a and 102b (FIG. 1) or 254a, 254b and 254m (FIG. 2) to reduce transmit power based on having a lower priority of traffic; (ii) communicating the reduced transmit power levels of the first and second transmitter to a network note to prompt the network node 104 (FIG. 1), 212 (FIG. 2) to make a transmission characteristic change; (iii) assigning all traffic to one transmitter (from among 102a and 102b (FIG. 1) or 254a, 254b and 254m (FIG. 2) and turning off the other transmitter(s); and (iv) improving amplification linearity. Then, method 600 returns to block 602 to continue monitoring for transmission characteristics of concurrently transmitting first and second transmitters.

Figure 7A:
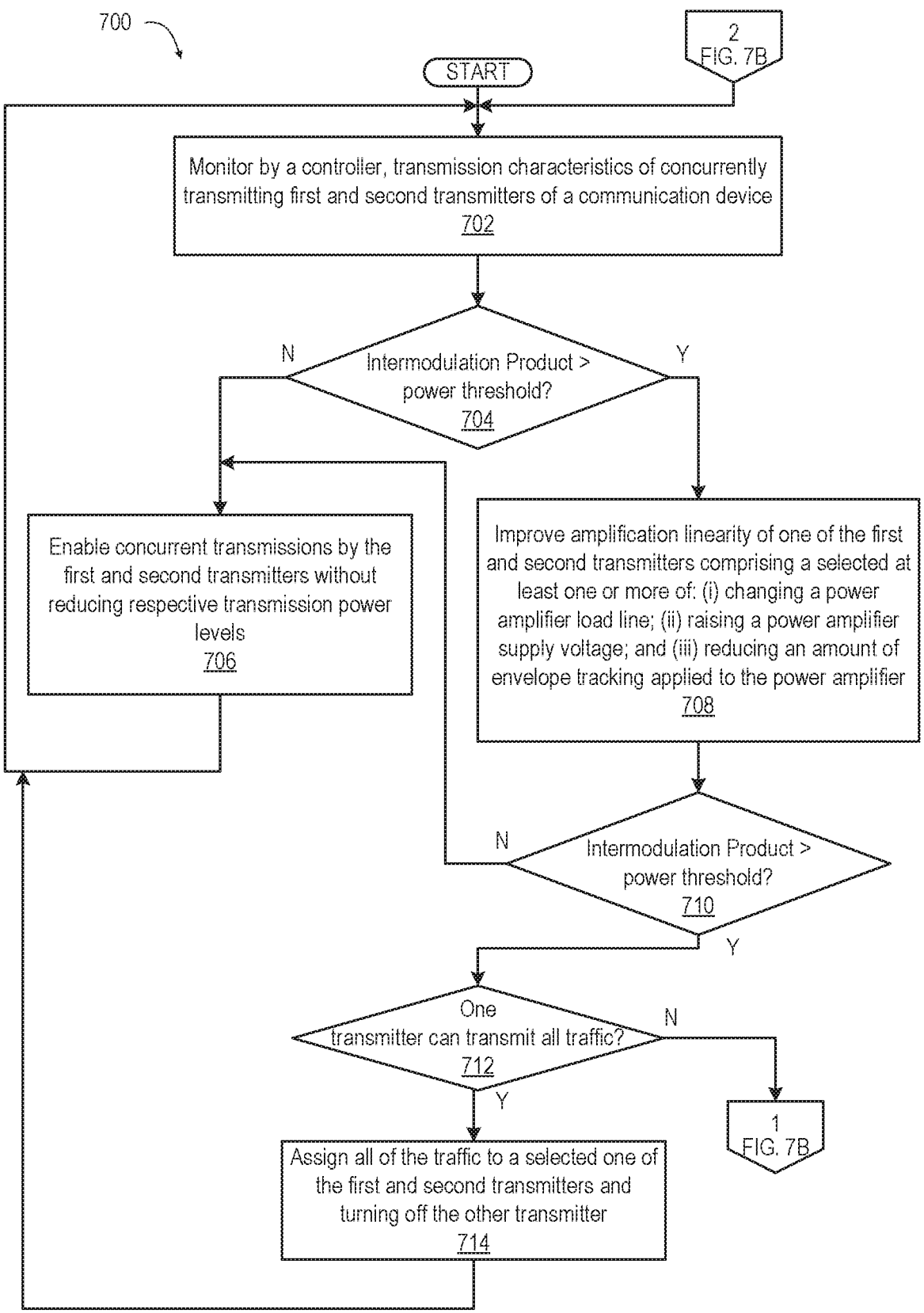
FIGS. 7A-B are flow diagrams illustrating a method for selecting one or more appropriate communication quality mitigations, according to one or more embodiments.
Figure 7B:
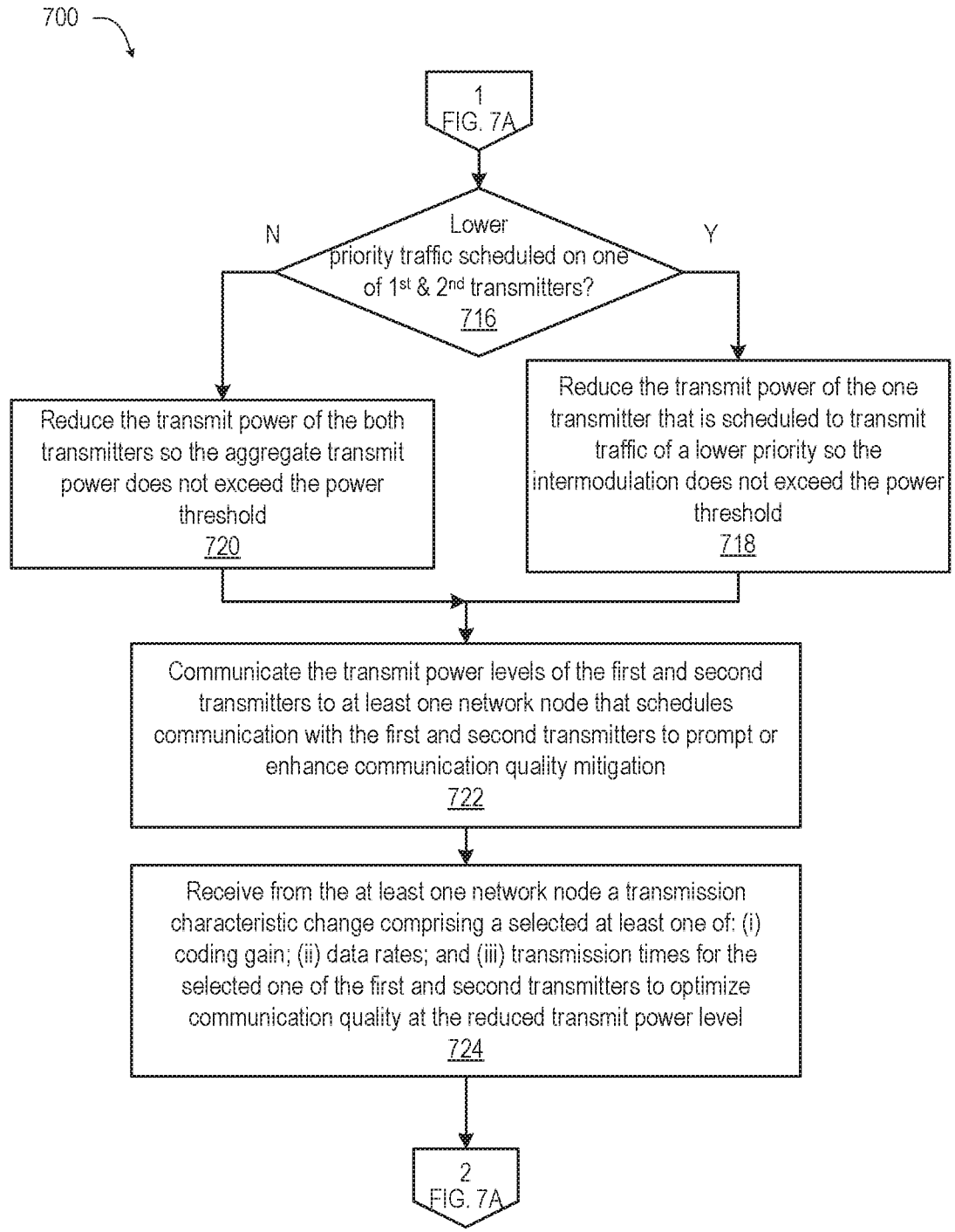

FIGS. 7A-B are a flow diagram illustrating a method 700 for selecting one or more appropriate communication quality mitigations in response to intermodulation interference.) With reference to FIG. 7A, method 700 includes monitoring, by a controller (134 (FIG. 1), 226 (FIG. 2)), transmission characteristics of first and second transmitters (102a and 102b (FIG. 1) or 254a, 254b and 254m (FIG. 2)) of a communication device (100 (FIG. 1), 200 (FIG. 2)) that concurrently transmit (block 702). A determination is made whether concurrent transmissions by the first and second transmitters (102a and 102b (FIG. 1) or 254a, 254b and 254m (FIG. 2)) create an intermodulation product having a power level at one or more frequencies that exceeds an intermodulation threshold (decision block 704). In response to determining that the intermodulation product does not exceed the intermodulation threshold, method 700 includes enabling concurrent transmissions by the first and second transmitters (102a and 102b (FIG. 1) or 254a, 254b and 254m (FIG. 2)) at currently set respective transmission power levels (block 706). Then method 700 returns to block 702 to continue monitoring for transmission characteristics of concurrently transmitting first and second transmitters.

In response to determining in decision block 704 that the intermodulation product exceeds the intermodulation threshold, method 700 includes improving amplification linearity of one of the first and second transmitters (block 708). Improving amplification linearity includes a selected one or more of: (i) changing a power amplifier load line; (ii) raising a power amplifier supply voltage; and (iii) reducing an amount of envelope tracking applied to a power amplifier. Improved amplification linearity reduces the intermodulation product. A determination is made whether concurrent transmissions by the first and second transmitters create an intermodulation product having a power level at one or more frequencies that exceeds an intermodulation threshold (decision block 710). In response to determining that the intermodulation product does not exceed the intermodulation threshold, method 700 proceeds to block 706 to enable concurrent transmissions by the first and second transmitters at previously selected transmission power levels.

In response to determining in decision block 710 that the intermodulation product continues to exceed the intermodulation threshold even with improved amplification linearity, method 700 includes determining whether one transmitter 102a and 102b (FIG. 1), 254a, 254b and 254m (FIG. 2) can transmit all of the traffic assigned to both the first and second transmitters 102a and 102b (FIG. 1), 254a, 254b and 254m (FIG. 2) (decision block 712). In response to determining that one transmitter 102a and 102b (FIG. 1), 254a, 254b and 254m (FIG. 2) can transmit all of the traffic assigned to both the first and second transmitters 102a and 102b (FIG. 1), 254a, 254b and 254m (FIG. 2), method 700 includes assigning all of the traffic to a selected one of the first and second transmitters 102a and 102b (FIG. 1), 254a, 254b and 254m (FIG. 2) and turning off the other transmitter 102a and 102b (FIG. 1), 254a, 254b and 254m (FIG. 2) (block 714). Method 700 returns to block 702 to continue monitoring for transmission characteristics of concurrently transmitting first and second transmitters. In response to determining that none of the transmitters 102a and 102b (FIG. 1), 254a, 254b and 254m (FIG. 2) can transmit all of the traffic assigned to both the first and second transmitters 102a and 102b (FIG. 1), 254a, 254b and 254m (FIG. 2), method 700 (FIG. 7B) determines whether one of the first and second transmitters 102a and 102b (FIG. 1), 254a, 254b and 254m (FIG. 2) is scheduled to transmit traffic of lower priority than the other transmitter 102a and 102b (FIG. 1), 254a, 254b and 254m (FIG. 2) (decision block 716). In response to determining that one of the first and second transmitters 102a and 102b (FIG. 1), 254a, 254b and 254m (FIG. 2) is scheduled to transmit traffic of lower priority than the other transmitter 102a and 102b (FIG. 1), 254a, 254b and 254m (FIG. 2), method 700 includes reducing the transmit power of the one transmitter 102a and 102b (FIG. 1), 254a, 254b and 254m (FIG. 2) that is scheduled to transmit traffic of a lower priority, so that the aggregate transmit power does not exceed the power threshold (block 718). In response to determining that the first and second transmitters 102a and 102b (FIG. 1), 254a, 254b and 254m (FIG. 2) are scheduled to transmit traffic of the same priority, method 700 includes reducing the transmit power of both transmitters 102a and 102b (FIG. 1), 254a, 254b and 254m (FIG. 2) so the intermodulation product does not exceed the power threshold (block 720). After reducing transmit power(s) in either block 718 or block 720, method 700 includes communicating the transmit power levels of the first and second transmitters 102a and 102b (FIG. 1), 254a, 254b and 254m (FIG. 2) to at least one network node 104 (FIG. 1), 212 (FIG. 2) that schedules communication with the first and second transmitters 102a and 102b (FIG. 1), 254a, 254b and 254m (FIG. 2) (block 722). Method 700 includes receiving from the at least one network node 104 (FIG. 1), 212 (FIG. 2) a transmission characteristic change comprising at least one of: (i) coding gain; (ii) data rates; and (iii) transmission times for the selected one of the first and second transmitters 102a and 102b (FIG. 1), 254a, 254b and 254m (FIG. 2) to optimize communication quality at the reduced transmit power level (block 724). Then, method 700 returns to block 702 (FIG. 7A).

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiment(s) described above was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   monitoring, by a controller, transmission characteristics of first and second transmitters of a communication device that concurrently transmit;
   receiving, by the controller, status information for transmit power and transmit frequency and on/off status for each of the first and second transmitters;
   determining whether concurrent transmissions by the first and second transmitters create an intermodulation product having a power level at one or more frequencies that exceeds an intermodulation threshold for spurious emissions to a thirty-party receiver; and in response to determining that the intermodulation product exceeds the intermodulation threshold for spurious emissions: looking up, within a lookup table, at least one response that reduces the spurious emissions to thirty-party receivers, the at least one response based on the received status information for transmit power and transmit frequency; and triggering, by the controller, based on a selected response from the lookup table that reduces the spurious emissions, operation of a reduced transmit power mode that reduces the power level of the intermodulation product to not exceed the intermodulation threshold for spurious emissions and that includes communication quality mitigation, wherein the triggering comprises:

determining, from the lookup table, whether a transmitter from among the first and second transmitter having a primary data path is indicated as an appropriate data path for all traffic; and in response to the primary data path being indicated in the lookup table as the appropriate data path, moving all traffic from the other transmitter to the transmitter having the primary data path.

2. The method of claim 1, wherein triggering operation of the reduced transmit power mode comprises:

reducing the transmit power level of at least one of the first and second transmitters;

communicating the transmit power levels of the first and second transmitters to at least one network node that schedules communication with the first and second transmitters; and receiving from the at least one network node a transmission characteristic change in a selected at least one of: (i) coding gain; (ii) data rates; and (iii) transmission times for the selected one of the first and second transmitters to optimize communication quality at the reduced transmit power level, the change in coding gain comprising the at least one network node instructing a respective transmitter to include a more robust error correction code with transmitted data, the change in data rates comprising reducing a data rates to make detection of transmitted data easier for a receiving network, and the change in transmission times comprising adjusting transmit times so that concurrent transmissions by the first and second transmitters are avoided, allowing each transmitter to operate at a power level that is not affected by another transmitter; and subsequently transmitting via the first and second transmitters in compliance with the received transmission characteristic change in a selected at least one of: (i) coding gain; (ii) data rates; and (iii) transmission times.

3. The method of claim 1, wherein triggering operation of the reduced transmit power mode comprises reducing transmit power level of a selected one of the first and second transmitters based on the selected one having a lower priority of traffic than the other transmitter.

4. The method of claim 1, wherein triggering operation of the reduced transmit power mode comprises assigning traffic scheduled respectively for the first and second transmitters to a selected one of the transmitters and turning off the other transmitter.

5. The method of claim 1, wherein triggering operation of the reduced transmit power mode comprises:

first improving amplification linearity of one of the first and second transmitters to reduce the intermodulation product, by a selected one or more of: (i) changing a power amplifier load line; (ii) raising a power amplifier supply voltage; and (iii) reducing an amount of envelope tracking applied to a power amplifier; and triggering operation of the reduced transmit power mode in response to the improving in the amplification linearity not resulting in reducing the intermodulation product below the intermodulation threshold for spurious emissions.

6. The method of claim 1, further comprising:

determining whether the concurrent transmissions by the first and second transmitters create an intermodulation product having a power level at one or more frequencies that exceeds an intermodulation threshold for desensing a receiver of the communication device;

monitoring reception characteristics of first and second receivers associated respectively with the first and second transmitters, the reception characteristics monitored comprises at least one or more of signal strength, coding gain, and data type; and triggering operation of the reduced transmit power mode in response to determining that concurrent transmissions by the first and second transmitters create the intermodulation product having the power level at one or more frequencies that exceeds the intermodulation threshold for desensing at least one of the first and second receivers based on the monitored transmission and reception characteristics.

7. The method of claim 1, wherein:

the looking up comprises looking up, within the lookup table, the appropriate data path based on the received status information for transmit power and transmit frequency.

8. The method of claim 7, wherein the triggering further comprises:

in response to determining that the primary transmitter is not the appropriate data path for all traffic, moving data from the primary transmitter to the other transmitter and enabling transmission by both the other transmitter and the primary transmitter;

wherein enabling transmission by the primary transmitter comprises enabling the primary transmitter to perform non-Internet data transmissions, having limited capacity for retransmission.

9. The method of claim 1, wherein:

the looking up comprises looking up, within the lookup table, an exclusion based on the received status information for transmit power and transmit frequency; and the triggering comprises sending, to a network node, exclusion frequency range and power limit information, corresponding to the exclusion, the network node responding to receipt of the exclusion information by providing mitigations based on the exclusion frequency range and power limit.

10. The method of claim 1, wherein the spurious transmission is cause by the first and second transmitters concurrently transmitting respective transmit signals in a same band and each transmit signal is close enough to the other transmit signal, such that an interferer is also in the transmit band and filter isolation is minimal.

11. A communication device comprising:

concurrently-transmitting first and second transmitters; and a controller communicatively coupled to the first and second transmitters and that executes an intermodulation mitigation utility that enables the communication device to:
monitor transmission characteristics of first and second transmitters of a communication device that concurrently transmit;
receive status information for transmit power and transmit frequency and on/off status for each of the first and second transmitters;
determine whether concurrent transmissions by the first and second transmitters create an intermodulation product having a power level at one or more frequencies that exceeds an intermodulation threshold for spurious emissions to a thirty-party receiver; and
in response to determining that the intermodulation product exceeds the intermodulation threshold for spurious emissions: look up, within a lookup table, at least one response that reduces the spurious emissions to thirty-party receivers, the at least one response based on the received status information for transmit power and transmit frequency; and trigger, based on a selected response from the lookup table that addresses the spurious emissions, operation of a reduced transmit power mode that reduces the power level of the intermodulation product to not exceed the intermodulation threshold for spurious emissions and that includes communication quality mitigation, wherein to trigger the operation of the reduced transmit power mode the controller:
determines, from the lookup table, whether a transmitter from among the first and second transmitter having a primary data path is indicated as an appropriate data path for all traffic; and
in response to the primary data path being indicated in the lookup table as the appropriate data path, moves all traffic from the other transmitter to the transmitter having the primary data path.

12. The communication device of claim 11, wherein, to trigger operation of the reduced transmit power mode, the controller enables the communication device to:
reduce the transmit power level of at least one of the first and second transmitters;
communicate the transmit power levels of the first and second transmitters to at least one network node that schedules communication with the first and second transmitters;
receive from the at least one network node a transmission characteristic change in a selected at least one of: (i) coding gain; (ii) data rates; and (iii) transmission times for the selected one of the first and second transmitters to optimize communication quality at the reduced transmit power level, the change in coding gain comprising the at least one network node instructing a respective transmitter to include a more robust error correction code with transmitted data, the change in data rates comprising reducing a data rates to make detection of transmitted data easier for a receiving network, and the change in transmission times comprising adjusting transmit times so that concurrent transmissions by the first and second transmitters are avoided, allowing each transmitter to operate at a power level that is not affected by another transmitter; and
subsequently transmit via the first and second transmitters in compliance with the received transmission characteristic change in a selected at least one of: (i) coding gain; (ii) data rates; and (iii) transmission times.

13. The communication device of claim 11, wherein, to trigger operation of the reduced transmit power mode, the controller enables the communication device to perform at least one of:
reduce transmit power level of a selected one of the first and second transmitters based on the selected one having a lower priority of traffic than the other transmitter; and
assign traffic scheduled respectively for the first and second transmitters to a selected one of the transmitters and turning off the other transmitter.

14. The communication device of claim 11, wherein, to trigger operation of the reduced transmit power mode, the controller enables the communication device to:
first improve amplification linearity of one of the first and second transmitters to reduce the intermodulation product, by a selected one or more of: (i) changing a power amplifier load line; (ii) raising a power amplifier supply voltage; and (iii) reducing an amount of envelope tracking applied to a power amplifier; and
trigger operation of the reduced transmit power mode in response to the improving in the amplification linearity not resulting in reducing the intermodulation product below the intermodulation threshold for spurious emissions.

15. The communication device of claim 11, wherein the controller enables the communication device to:
determine whether the concurrent transmissions by the first and second transmitters create an intermodulation product having a power level at one or more frequencies that exceeds an intermodulation threshold for desensing a receiver of the communication device;
monitor reception characteristics of first and second receivers associated respectively with the first and second transmitters, wherein the reception characteristics monitored comprises at least one or more of signal strength, coding gain, and data type; and
triggering operation of the reduced transmit power mode in response to determining that concurrent transmissions by the first and second transmitters create the intermodulation product having the power level at one or more frequencies that exceeds the intermodulation threshold for desensing at least one of the first and second receivers based on the monitored transmission and reception characteristics.

16. The communication device of claim 11, wherein:
in looking up the response, the controller enables the communication device to look up, within the lookup table, an appropriate data path based on the received status information for transmit power and transmit frequency; and
in performing the triggering, the controller further enables the communication device to:
in response to determining that the primary transmitter is not the appropriate data path for all traffic, move data from the primary transmitter to the other transmitter and enabling transmission by both the other transmitter and the primary transmitter;
wherein in enabling transmission by the primary transmitter, the controller enables the primary transmitter to perform non-Internet data transmissions, having limited capacity for retransmission.

17. The communication device of claim 11, wherein:
in looking up the response, the controller enables the communication device look up, within the lookup table, an exclusion based on the received status information for transmit power and transmit frequency; and in performing the triggering, the controller enables the communication device to send, to a network node, exclusion frequency range and power limit information, corresponding to the exclusion, the network node responding to receipt of the exclusion information by providing mitigations based on the exclusion frequency range and power limit.

18. A computer program product comprising:

a computer readable storage device; and program code on the computer readable storage device that when executed by a processor associated with an electronic device, the program code enables the electronic device to provide the functionality of:

monitoring transmission characteristics of first and second transmitters of a communication device that concurrently transmit;

receiving, by the controller, status information for transmit power and transmit frequency and on/off status for each of the first and second transmitters;

determining whether concurrent transmissions by the first and second transmitters create an intermodulation product having a power level at one or more frequencies that exceeds an intermodulation threshold for spurious emissions to a thirty-party receiver; and in response to determining that the intermodulation product exceeds the intermodulation threshold for spurious emissions: looking up, within a lookup table, at least one response that reduces the spurious emissions to thirty-party receivers, the at least one response based on the received status information for transmit power and transmit frequency; and triggering, based on a selected response from the lookup table that addresses the spurious emissions, operation of a reduced transmit power mode that reduces the power level of the intermodulation product to not exceed the intermodulation threshold for spurious emissions and that includes communication quality mitigation, wherein the code for triggering comprises code for:

determining, from the lookup table, whether a transmitter from among the first and second transmitter having a primary data path is indicated as an appropriate data path for all traffic; and in response to the primary data path being indicated in the lookup table as the appropriate data path, moving all traffic from the other transmitter to the transmitter having the primary data path.

19. The computer program product of claim 18, wherein:

the program code that enables the functionality of looking up the response comprises program code for looking up, within the lookup table, an appropriate data path based on the received status information for transmit power and transmit frequency; and the program code that enables the functionality of triggering operation of a reduced transmit power mode further comprises code for:

in response to determining that the primary transmitter is not the appropriate data path for all traffic, moving data from the primary transmitter to the other transmitter and enabling transmission by both the other transmitter and the primary transmitter;

wherein enabling transmission by the primary transmitter comprises enabling the primary transmitter to perform non-Internet data transmissions, having limited capacity for retransmission.

20. The computer program product of claim 18, wherein:

the program code that enables the functionality of looking up the response comprises program code for looking up, within the lookup table, an exclusion based on the received status information for transmit power and transmit frequency; and the program code that enables the functionality of triggering operation of a reduced transmit power mode comprises code for sending, to a network node, exclusion frequency range and power limit information, corresponding to the exclusion, the network node responding to receipt of the exclusion information by providing mitigations based on the exclusion frequency range and power limit.

* * * * *